United States Patent
Yoshida et al.

(10) Patent No.: US 9,731,993 B2
(45) Date of Patent: Aug. 15, 2017

(54) METHOD FOR PRODUCING POROUS GLASS BASE MATERIAL

(71) Applicant: Shin-Etsu Chemical Co., Ltd., Tokyo (JP)

(72) Inventors: Makoto Yoshida, Gunma (JP); Yuhei Urata, Ibaraki (JP); Yuichi Matsunaga, Ibaraki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/090,620

(22) Filed: Apr. 5, 2016

(65) Prior Publication Data

US 2016/0289113 A1   Oct. 6, 2016

(30) Foreign Application Priority Data

Apr. 6, 2015   (JP) .................................. 2015-077505

(51) Int. Cl.
*C03B 37/018*   (2006.01)
*C03B 37/014*   (2006.01)

(52) U.S. Cl.
CPC .... *C03B 37/01486* (2013.01); *C03B 37/0142* (2013.01); *C03B 2203/23* (2013.01); *C03B 2207/36* (2013.01); *C03B 2207/50* (2013.01); *C03B 2207/64* (2013.01); *C03B 2207/66* (2013.01); *C03B 2207/70* (2013.01)

(58) Field of Classification Search
CPC ............ C03B 37/0142; C03B 2207/66; C03B 2207/70; C03B 37/01413; C03B 2203/22; C03B 19/1415; C03B 37/01807
See application file for complete search history.

(56) References Cited

U.S. PATENT DOCUMENTS

| | | | | |
|---|---|---|---|---|
| 7,716,951 B2 * | 5/2010 | Ooishi | ................ | C03B 37/0142 65/377 |
| 2007/0271962 A1 * | 11/2007 | Inoue | ................ | C03B 37/01486 65/377 |
| 2010/0011813 A1 * | 1/2010 | Inoue | ................ | C03B 37/01413 65/29.12 |
| 2011/0107797 A1 * | 5/2011 | Inoue | ................ | C03B 37/01413 65/377 |
| 2014/0090426 A1 * | 4/2014 | Urata | ................ | C03B 37/01413 65/382 |
| 2015/0183676 A1 * | 7/2015 | Trommer | ............ | C03B 19/1415 65/29.12 |
| 2015/0246841 A1 * | 9/2015 | Itou | ........................ | C03B 37/014 65/415 |
| 2015/0360992 A1 * | 12/2015 | Yoshida | .............. | C03B 37/0142 65/414 |

FOREIGN PATENT DOCUMENTS

| | | |
|---|---|---|
| JP | 6-15413 B2 | 3/1994 |
| JP | 6-17238 B2 | 3/1994 |

* cited by examiner

*Primary Examiner* — Jodi C Franklin
(74) *Attorney, Agent, or Firm* — Hauptman Ham, LLP (57) ABSTRACT

In a device for producing a large-sized porous base material by a VAD process, the cracking and variation of the outer diameter of the base material are suppressed by forming a smooth tapered part, without changing the length of a non-effective part. In producing the porous base material by a VAD process, the time for a gas to reach a flow amount of the gas in a steady state from starting of the deposition is extended more in a burner that deposits glass microparticles on a layer closer to the outside of the base material.

2 Claims, 9 Drawing Sheets

METHOD FOR PRODUCING POROUS GLASS BASE MATERIAL

CROSS-REFERENCE TO RELATED APPLICATION

This non-provisional application claims priority under 35 U.S.C. §119(a) from Japanese Patent Application No. 2015-077505, filed on Apr. 6, 2015, the entire contents of which are incorporated herein by reference.

BACKGROUND

Technical Field

The present invention relates to a method for producing a porous glass base material, by which a base material in which cracking of the base material during deposition and variation in the outer diameter occur little can be produced in the case when a large-sized porous glass base material is produced.

Background Art

As a method for producing optical fibers, a VAD process (a vapor phase axial deposition process) is well-known. The VAD process is a process for producing a porous glass base material composed of a core layer and a clad layer by disposing a plurality of burners in a reaction container, feeding a glass raw material gas such as silicon tetrachloride, a combustible gas such as hydrogen and a combustion-assisting gas such as oxygen to the respective burners, hydrolyzing the glass raw material in oxyhydrogen flame to form glass microparticles, and depositing the generated glass microparticles along a central axis of a starting element starting from the starting element, wherein the starting element rotates around its central axis as a rotational axis and is relatively drawn up with respect to the burners.

Figure 1:
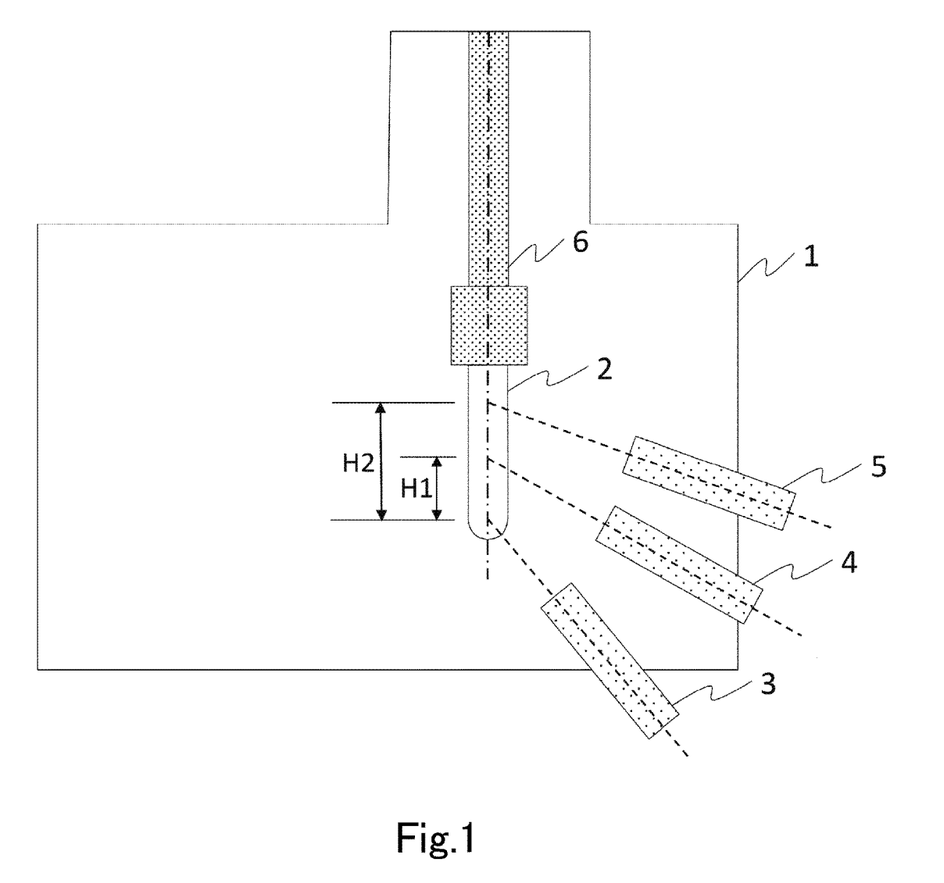
FIG. 1 is a drawing showing an example of a production device for carrying out the method for producing a porous glass base material of the present invention.
Figure 2:
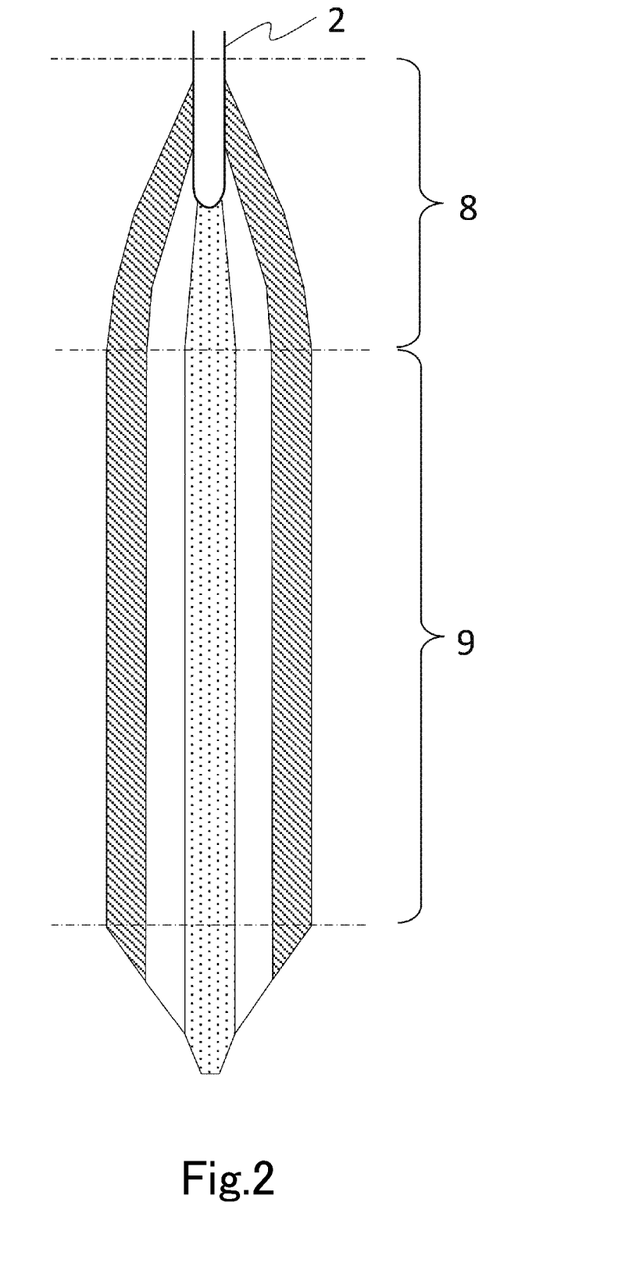
FIG. 2 is a drawing showing the schematic shape of the porous glass base material.

Specifically, for example, as shown in FIG. 1, in a reaction container 1, a first burner 3 for depositing a core, a second burner 4 for depositing a first clad deposit, and a third burner 5 for depositing a second clad are disposed in this order, toward the distance from the vicinity of the central axis of the starting element 2 fixed on a hang shaft 6, and toward the upper side from the perpendicularly lower side, and germanium tetrachloride for doping $GeO_2$ is fed to the first burner 3 besides silicon tetrachloride. Glass microparticles are sprayed from the first burner 3, the second burner 4 and the third burner 5 to the thin starting element 2 having a diameter of about 20 mm, which is drawn up while being rotated, and as shown in FIG. 2, a porous glass base material is gradually thickened at the lower part of the starting element 2 and grown to a desired outer diameter of a diameter of about 180 mm (formation of a non-product tapered part 8), and deposited with retaining the deposition state stable (formation of a product cylindrical part 9), whereby a desired porous glass base material is produced.

In the case when the gas flow amounts at a steady state for forming the product cylindrical part 9 are introduced in the respective burners from the starting of the deposition, since the amounts of the gases are too much with respect to the thin outer diameter of the non-product tapered part 8, problems that the deposit efficiency is significantly decreased, and that the density excessively increases and thus bending and deformation in the base material occur. Therefore, a method for solving such problem by presetting a gas flow amount at an initial stage of deposition smaller than a gas flow amount at a steady state is disclosed in JP 06-015413 B2 and JP 06-017238 B2.

SUMMARY OF THE INVENTION

Problems to be Solved by the Invention

In recent years, increasing in sizes of base materials has been proceeding rapidly, and a large-sized porous glass base material having a large outer diameter is produced by increasing gas flow amounts at a steady state. However, in the case when gas flow amounts at a steady state are increased without changing times from the initiation of deposition to a steady state from conventional times for increasing the size, the amount of change of the gas flow amount per unit time is increased. When the gas flow amount is changed, the distribution of the deposition amounts and the densities in the flames in the respective burners are changed. Specifically, in the case when the gas flow amounts are significantly changer, glass microparticles are not deposited into a smooth tapered shape, and the surface tends to have concave and convex. Furthermore, since the taper itself becomes steep, when deposition is conducted by the further outer burner around the part where the non-product tapered part 8 deposited by the burner at the inner side transfers to the product cylindrical part 9, the change in the deposition amount of the transition part increases, and concave and convex tend to be generated also at that part.

If the concave and convex of the non-product tapered part 8 increase by this way, the variation of the outer diameter also remains on the product cylindrical part 9, and thus a problem that failure in the variation of the outer diameter at the product terminal part of the product increases, and a problem that the base material is cracked during the deposition due to the effect of the difference in density which is present on the concave and convex part, easily occur.

An object of the present invention is to provide a method for producing a porous glass base material, which forms a smooth tapered part, and can suppress the cracking and the variation in the outer diameter of the base material without changing the length of a non-effective part, in a device for producing a large-sized porous glass base material by a VAD process.

Means for Solving the Problems

The method for producing a porous glass base material of the present invention includes producing a porous glass base material by disposing glass microparticles generated by burners, starting from a starting element that is rotating around its central axis as a rotation axis, along the central axis of the starting element, while the starting element is relatively drawn up with respect to the burners, the burners generate the glass microparticles by hydrolyzing a gas containing glass raw materials in oxyhydrogen flame, wherein a first burner, which is configured to form a core part of the porous glass base material, a second burner, which is configured to form a first clad part on the outer periphery of the core part, and a third burner of the burners, which is configured to form a second clad part on the outer periphery of the first clad part, are used, and wherein Ta<Tb<Tc, wherein Ta (min) is a time for a flow amount of the gas that is fed to the first burner to reach a flow amount at a steady state by increasing the flow amount from a flow amount of the gas at starting of the deposition, Tb (min) is a time for a flow amount of the gas that is fed to the second burner to reach a flow amount at a steady state by increasing the flow amount from a flow amount at the starting of the deposition, and Tc (min) is a time for a flow amount of the gas that is fed to the third burner to reach a flow amount at a steady state by increasing the flow amount from a flow amount at the starting of the deposition. By this way, generation of concave and convex on the surface of a non-product tapered part can be suppressed, and thus the glass microparticles can be deposited in a smooth tapered shape.

Furthermore, it is preferable to constitute Ta, Tb and Tc so that 0<(Tb−Ta)<(H1/v) and 0<(Tc−Ta)<(H2/v) are satisfied, wherein v (mm/min) is a draw-up velocity of the starting element, H1 (mm) is a distance between a cross point of an extended line of the central axis of the first burner and the central axis of the starting element and a cross point of an extended line of the central axis of the second burner and the central axis of the starting element, and H2 (mm) is a distance between a cross point of an extended line of the central axis of the first burner and the central axis of the starting element and a cross point of an extended line of the central axis of the third burner and the central axis of the starting element. By this way, the surface of the non-product tapered part is smoothen, as well as deficiency in the thickness of the clad at the part where the non-product tapered part transfers to the product cylindrical part, which may occur by using different times for reaching the flow amount of the gas at a steady state in respective burners, can be suppressed, and thus a better base material can be provided.

DETAILED DESCRIPTION OF THE EMBODIMENTS

FIG. 1 shows an example of a production device for carrying out the method for producing a porous glass base material of the present invention. The method for producing a porous glass base material of the present invention is that, in a conventional production method including producing a porous glass base material by disposing glass microparticles generated by a plurality of burners, starting from a starting element 2 that is rotating around its central axis as a rotation axis, along the central axis of the starting element 2, wherein the burners generate the glass microparticles by hydrolyzing a gas containing glass raw materials in oxyhydrogen flame, while the starting element 2 is relatively drawn up with respect to the burners, different times for flow amounts of the gases at the starting of the deposition of the glass microparticles to reach flow amounts of the gases at a steady state by increasing the flow amount are used for the respective burners.

Specifically, for example, a first burner 3, which is configured to form a core part of the porous glass base material, a second burner 4, which is configured to form a first clad part on the outer periphery of the core part, and a third burner 5, which is configured to form a second clad part on the outer periphery of the first clad part, are used, and Ta, Tb and Tc are adjusted so that Ta<Tb<Tc, wherein Ta (min) is a time for a flow amount of the gas that is fed to the first burner to reach a flow amount at a steady state by increasing the flow amount from the flow amount at a starting of the deposition, Tb (min) is a time for a flow amount of the gas that is fed to the second burner to reach the flow amount at the steady state by increasing a flow amount from the flow amount at the starting of the deposition, and Tc (min) is a time for a flow amount of the gas that is fed to the third burner to reach a flow amount at a steady state by increasing the flow amount from a flow amount at the starting of the deposition.

Since the effect of the increasing of the diameter of the base material with respect to the degree of the change from the base material at the time of starting of the deposition to the gas flow amount at a steady state is greater in the layer closer to the outside of the base material, the amount of the change in the gas flow amount of the outer burner per unit time can be decreased by elongating the time for reaching a flow amount of a gas at a steady state in the burner that deposits the glass microparticles in the layer closer to the outside of the base material. By this way, generation of concave and convex on the surface of a non-product tapered part can be suppressed, and the deposition can be carried out with a smooth tapered shape.

Furthermore, in order to prevent deficiency in the thickness of the clad at the part where the non-product tapered part 8 transfers to a product cylindrical part 9, which may occur by using different times for reaching the flow amounts of the gases at a steady state in respective burners, it is preferable to constitute as follows.

Figure 3:
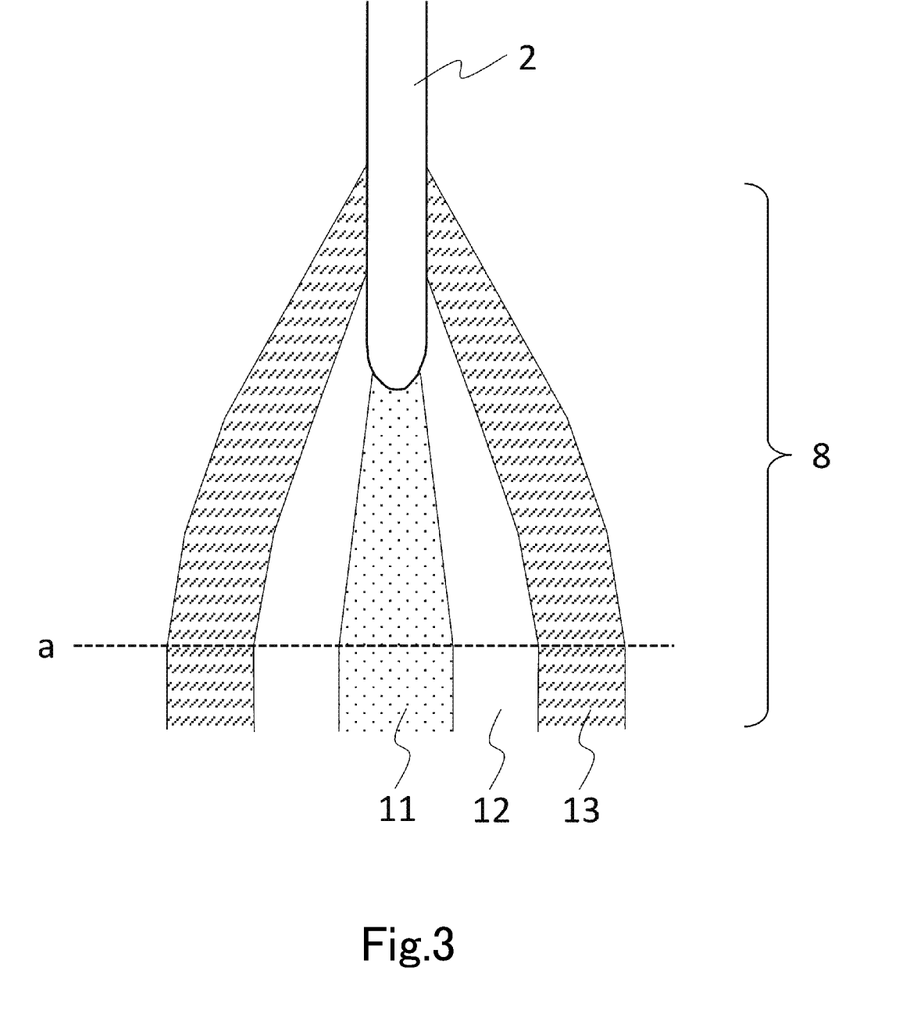
FIG. 3 is a drawing showing the schematic shape of a non-product tapered part.

FIG. 2 shows the schematic shape drawing of the porous glass base material, and FIG. 3 shows the schematic shape of the tapered part deposited by the three burners, respectively. The product cylindrical part 9 of the porous glass base material is positioned below the position where the gas flow amount of the first burner 3 for forming a core part has reached a flow amount at a steady state, and the shape of the deposited core part 11 has become a shape of a steady state (line a in FIG. 3). Therefore, it is substantially sufficient that the gas flow amounts of the second burner 4 for forming a first clad part and the third burner 5 for forming a second clad part have reached constant until the line a, and that the deposited first clad part 12 and second clad part 13 has become shapes of a steady state.

Accordingly, it is preferable to constitute Ta, Tb and Tc so that $0<(Tb-Ta)<(H1/v)$ and $0<(Tc-Ta)<(H2/v)$ are satisfied, wherein v (mm/min) is a draw-up velocity of the starting element, H1 (mm) is a distance between a cross point of an extended line of the central axis of the first burner and the central axis of the starting element and a cross point of an extended line of the central axis of the second burner and the central axis of the starting element, and H2 (mm) is a distance between a cross point of an extended line of the central axis of the first burner and the central axis of the starting element and a cross point of an extended line of the central axis of the third burner and the central axis of the starting element.

By this way, the gas flow amounts of the second and third burners have reached flow amounts at a steady state and the deposition shapes of the first and second clad parts are stabilized at above from the position where the gas flow amount of first burner has reached a flow amount of a steady state and the deposition shape of the core part is stabilized, whereby deficiency in the thickness of the clad at the part where the non-product tapered part transfers to the product cylindrical part can be prevented, and thus a better base material can be provided.

The method for producing a porous glass base material of the present invention can be suitably modified within the scope of the technical concept that is expressed in the present invention, and embodiments obtained by adding such modification or improvement are also encompassed in the technical scope of the present invention.

<Confirmation of Effect>

A glass raw material gas ($SiCl_4$), a combustible gas ($H_2$), a combustion-assisting gas ($O_2$) and the like were fed to a first burner 3, a second burner 4 and a third burner 5, glass microparticles were generated by a flame hydrolysis reaction, and the glass microparticles were deposited on a starting element 2 disposed in a reaction container 1, and the starting element 2 is drawn up above while the starting element 2 was rotated, thereby a porous glass base material was produced.

Conventional Example 1

The draw-up velocity of the starting element 2 was set to 1.0 (mm/min), the first burner 3, the second burner 4 and the third burner 5 were disposed at a positional relationship wherein H1=70 (mm) and H2=140 (mm), and $SiCl_4$ was fed to the respective burners at the flow amounts shown in Table 1, and the gas flow amount were continuously changed over 5 hours from the starting of the deposition to a steady state. The gas flow amounts of the combustible gas and the combustion-assisting gas were suitably adjusted depending on the flow amount of $SiCl_4$ to be fed, and after reaching flow amounts at a steady state, the deposition was carried out at those flow amounts, and the deposition was completed at after 24 hours. Ten pieces of the porous glass base material were deposited under the same conditions, and porous glass base materials having an average outer diameter of 180 mm in which the surface of the non-product tapered part 8 was formed to be smooth were consequently produced, and failures such as variation in the outer diameter of the product cylindrical part 9 (concave and convex) and cracking during the deposition did not occur.

TABLE 1

|  | Core deposition | First clad | Second clad |
| --- | --- | --- | --- |
| Start of deposition | 0.1 L/min | 0.2 L/min | 1.0 L/min |
| Steady state | 0.3 L/min | 0.8 L/min | 3.0 L/min |

Conventional Example 2

Comparative Example

Figure 4:
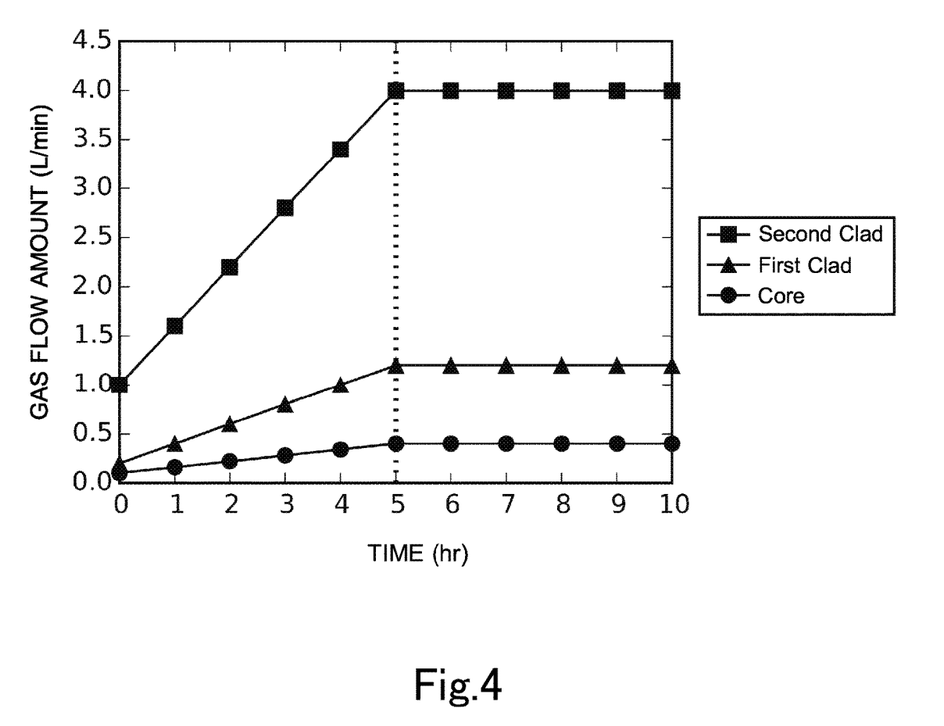
FIG. 4 is a drawing showing the change in a gas flow amount over the time, which was applied to the verification of a conventional production method.
Figure 5:
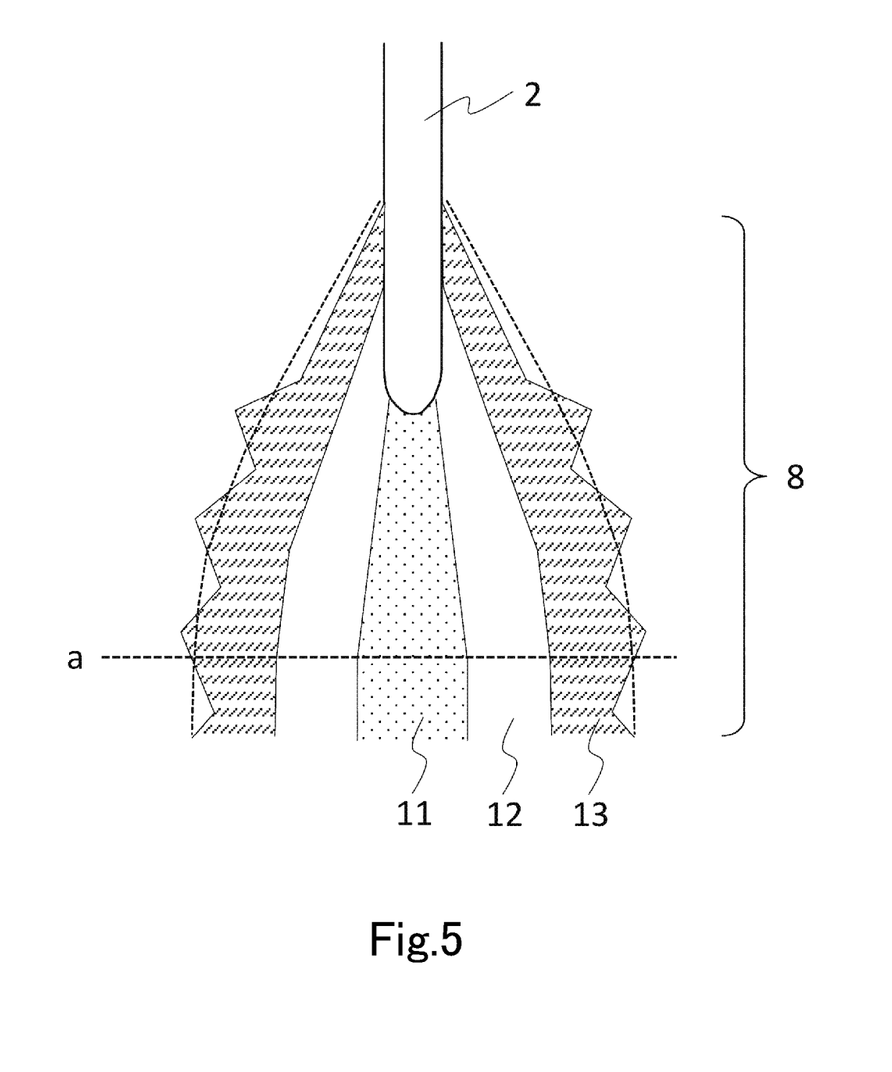
FIG. 5 is a drawing showing an example of the schematic shape of the non-product tapered part in the case when the size of the part was increased by a conventional production method.

The gas flow amount were continuously changed over 5 hours from the starting of the deposition to a steady state as shown in FIG. 4 in a similar manner to Conventional Example 1, except that the flow amounts of $SiCl_4$ to be fed to the respective burners were significantly increased as shown in Table 2 so as to increase the size of the base material. Ten pieces of the porous glass base material were deposited under the same conditions, and porous glass base materials having an average outer diameter of 200 mm were produced. However, as shown in FIG. 5, the variation (concave and convex) of the outer diameter of the non-product tapered part 8 was significant, and the variation also affected the product cylindrical part 9, and 5% of the product cylindrical parts 9 was judged to be defective due to the variation in the outer diameter. Furthermore, two pieces of the produced ten pieces were cracked beginning at the convex part of the concave and convex of the non-product tapered part 8.

TABLE 2

|  | Core deposition | First clad | Second clad |
| --- | --- | --- | --- |
| Start of deposition | 0.1 L/min | 0.2 L/min | 1.0 L/min |
| Steady state | 0.4 L/min | 1.2 L/min | 4.0 L/min |

Example 1

Figure 6:
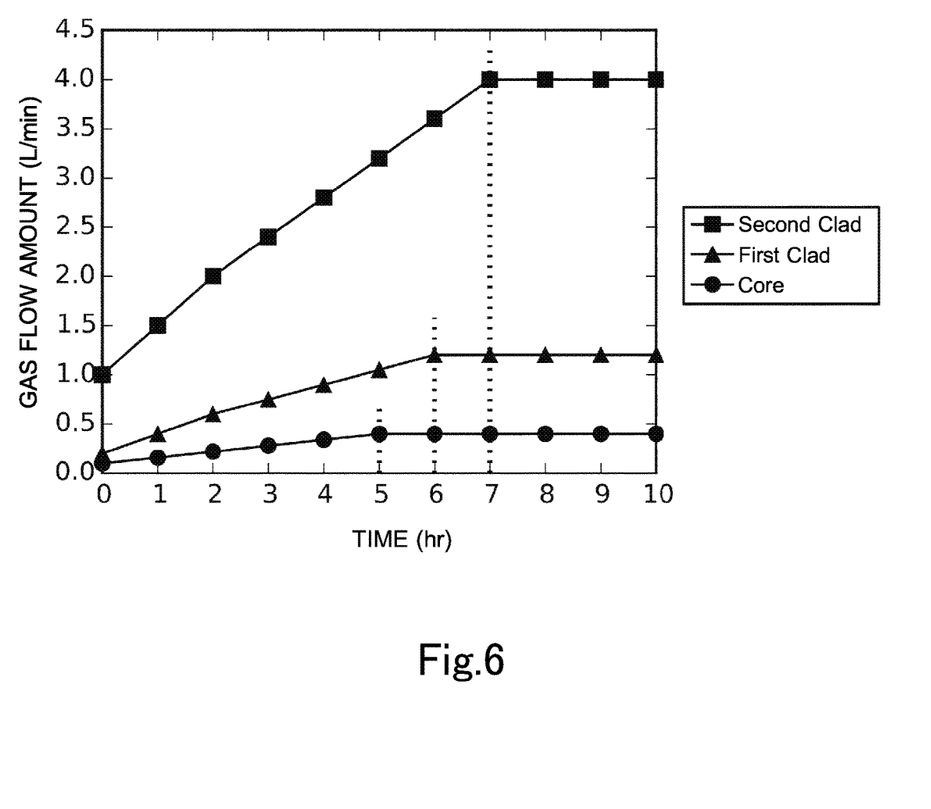
FIG. 6 is a drawing showing the change in the gas flow amount over the time, which was applied to the verification of the production method of the present invention.
Figure 7:
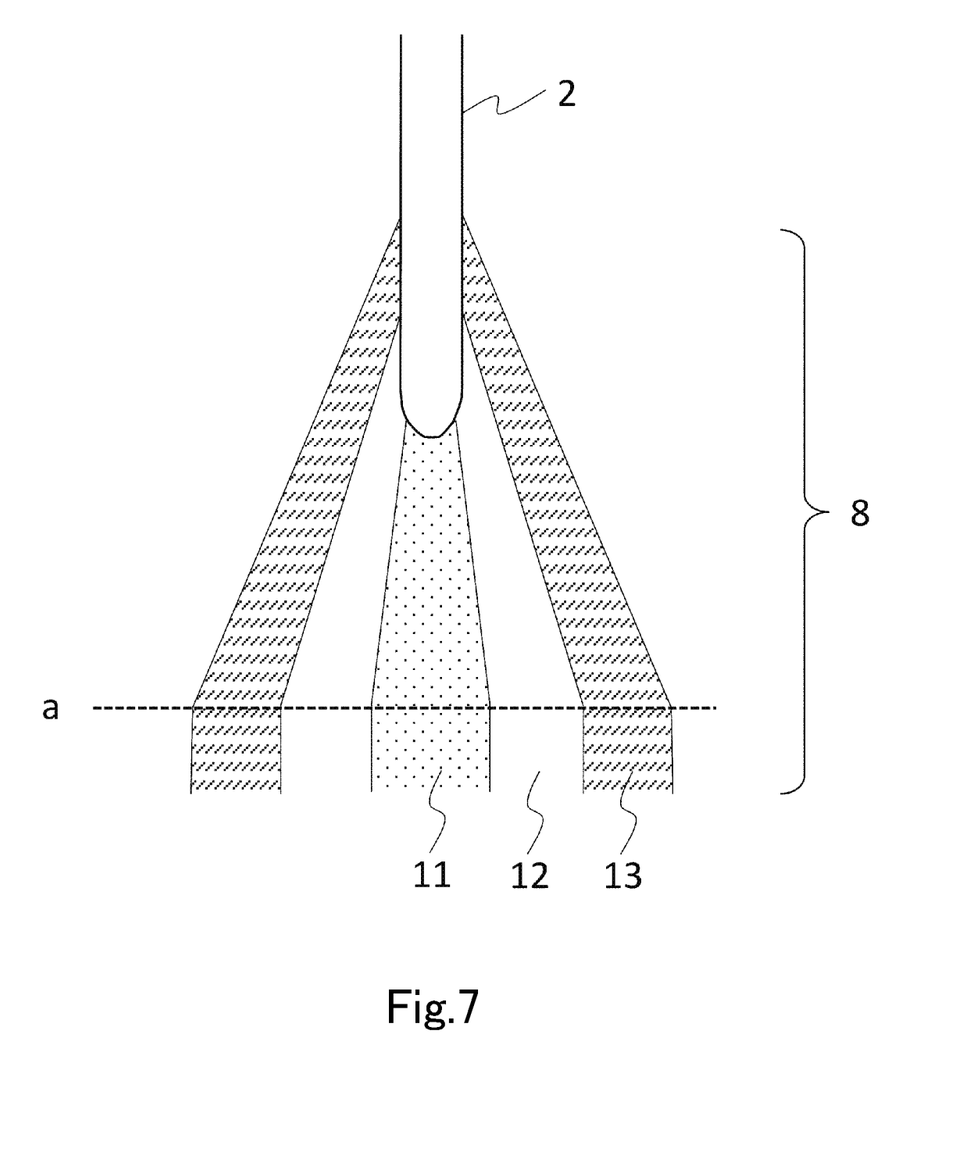
FIG. 7 is a drawing showing an example of the schematic shape of the non-product tapered part in the case when the size of the part was increased by the production method of the present invention.

As shown in FIG. 6, deposition was carried out in a similar method to that of Conventional Example 2, except that the gas flow amounts were changed from the starting of the deposition to a steady state over 5 hours for the first burner 3, over 6 hours for the second burner 4 and over 7 hours for the third burner 5. The gas flow amounts of the combustible gas and the combustion-assisting gas were suitably adjusted depending on the flow amounts of $SiCl_4$ to be fed. Ten pieces of the porous glass base material were deposited under the same conditions, and porous glass base materials having an average outer diameter of 200 mm in which the surface of the non-product tapered part 8 was formed to be smooth as shown in FIG. 7 were consequently produced, and failures such as variation in the outer diameter of the product cylindrical parts 9 (concave and convex) and cracking during the deposition did not occur.

Example 2

Comparative Example

Figure 8:
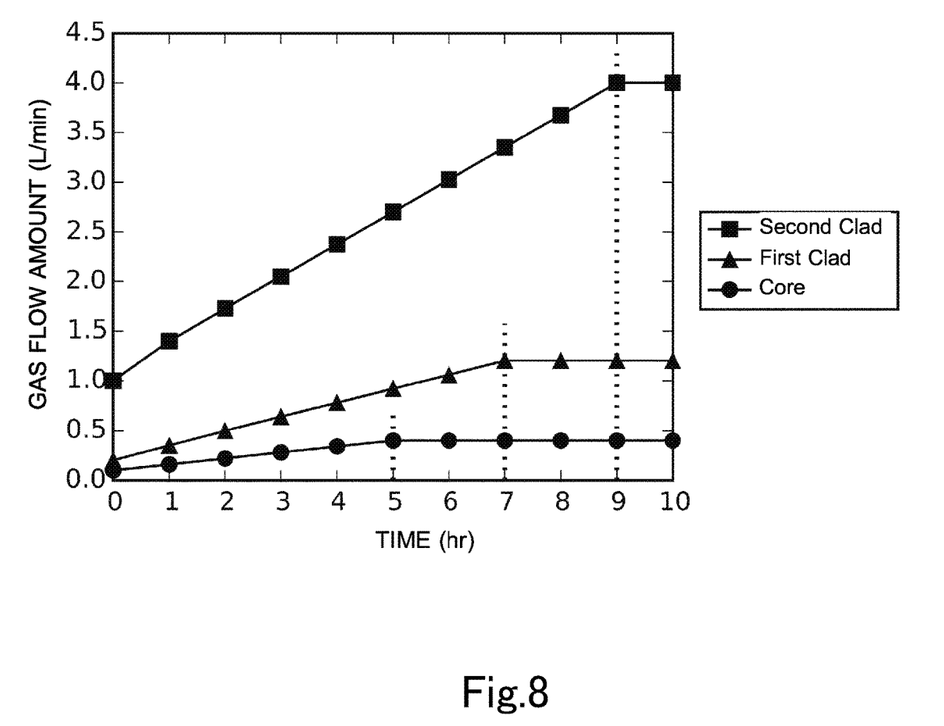
FIG. 8 is another drawing showing the change in the gas flow amount over the time, which was applied to the verification of the production method of the present invention.
Figure 9:
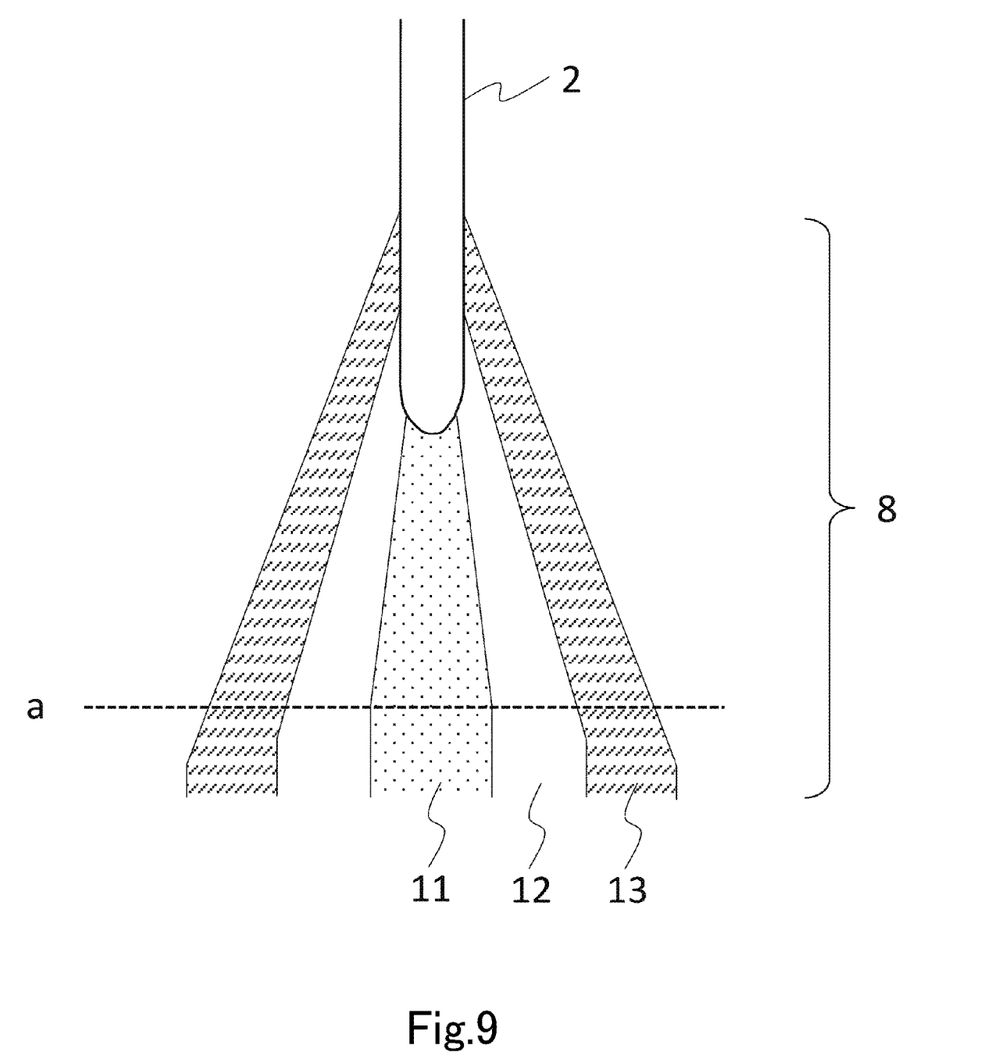
FIG. 9 is another drawing showing an example of the schematic shape of the non-product tapered part in the case when the size of the part was increased by the production method of the present invention.

As shown in FIG. 8, deposition was carried out in a similar method to that of Example 1, except that the gas flow amounts were changed from the starting of the deposition to a steady state over 5 hours for the first burner 3, over 7 hours for the second burner 4 and over 9 hours for the third burner 5, that is, the time presetting was changed so as not to satisfy the relationships of (Tb−Ta)<(H1/v) and (Tc−Ta)<(H2/v). The gas flow amounts of the combustible gas and the combustion-assisting gas were suitably adjusted depending on the flow amounts of $SiCl_4$ to be fed. Subsequently, porous glass base materials having an average outer diameter of 200 mm in which the surface of the non-product tapered part 8 was formed to be smooth as shown in FIG. 9 were produced, and failures such as variation in the outer diameter of the product cylindrical part 9 (concave and convex) and cracking during the deposition did not occur, but the shapes of the deposited first clad part 12 and second clad part 13 did not become shapes at a steady state and the deposited amounts were insufficient at the line a where the shape of the deposited core part 11 became a shape of a steady state, and thus 3% of the product cylindrical parts 9 had defective characteristic.

It is understood from the comparison of Conventional Examples and Examples that, according to the production method of the present invention, the surface of a non-product tapered part is formed to be smooth even the diameter of a base material is increased, and thus a porous glass base material in which variation in the outer diameter and cracking during deposition are difficult to occur can be produced. Furthermore, it is understood from the comparison of Example 1 and Example 2 that deficiency in the thickness of the clad at the part where the non-product tapered part transfers to the product cylindrical part can be prevented by optimizing the relationship of the gas flow amounts of the respective burners, the positions of the respective burners, and the draw-up velocity of the starting element, and thus a better base material can be provided.

REFERENCE SIGNS LIST

1 Reaction container
2 Starting element
3 First burner
4 Second burner
5 Third burner
6 Hang shaft
8 Non-product tapered part
9 Product cylindrical part
11 Core part
12 First clad part
13 Second clad part

What is claimed is:

1. A method for producing a porous glass base material, comprising producing a porous glass base material by disposing glass microparticles generated by burners, starting from a starting element that is rotating around its central axis as a rotation axis, along the central axis of the starting element, while the starting element is relatively drawn up with respect to the burners, the burners generate the glass microparticles by hydrolyzing a gas containing glass raw materials in oxyhydrogen flame, wherein
   a first burner of the burners, which is configured to form a core part of the porous glass base material,
   a second burner of the burners, which is configured to form a first clad part of the porous glass base material on the outer periphery of the core part, and
   a third burner of the burners, which is configured to form a second clad part of the porous glass base material on the outer periphery of the first clad part, are used, and wherein
   Ta<Tb<Tc, wherein Ta (min) is a time for a flow amount of the gas that is fed to the first burner to reach a flow amount at a steady state by increasing the flow amount from a flow amount at starting of the deposition, Tb (min) is a time for a flow amount of the gas that is fed to the second burner to reach a flow amount at a steady state by increasing the flow amount from a flow amount at the starting of the deposition, and Tc (min) is a time for a flow amount of the gas that is fed to the third burner to reach a flow amount at a steady state by increasing the flow amount from a flow amount at the starting of the deposition.

2. The method for producing a porous glass base material according to claim 1, wherein the relationships of (Tb−Ta)<(H1/v) and (Tc−Ta)<(H2/v) are satisfied, wherein
   v (mm/min) is a draw-up velocity of the starting element,
   H1 (mm) is a distance between a cross point of an extended line of the central axis of the first burner and the central axis of the starting element and a cross point of an extended line of the central axis of the second burner and the central axis of the starting element, and
   H2 (mm) is a distance between a cross point of an extended line of the central axis of the first burner and the central axis of the starting element and a cross point of an extended line of the central axis of the third burner and the central axis of the starting element.

* * * * *